United States Patent
Takayanagi et al.

(10) Patent No.: US 7,907,951 B2
(45) Date of Patent: Mar. 15, 2011

(54) WIRELESS COMMUNICATION SYSTEM AND BASE STATION

(75) Inventors: Daigo Takayanagi, Yokohama (JP); Kiyoshi Kawamoto, Yokohama (JP); Shiro Mazawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/603,621

(22) Filed: Oct. 22, 2009

(65) Prior Publication Data
US 2010/0040013 A1    Feb. 18, 2010

Related U.S. Application Data

(62) Division of application No. 11/476,058, filed on Jun. 28, 2006, now Pat. No. 7,634,278.

(30) Foreign Application Priority Data

Oct. 13, 2005  (JP) ................................ 2005-298425

(51) Int. Cl.
*H04W 72/00* (2009.01)
(52) U.S. Cl. .................. 455/452.1; 370/329; 370/335
(58) Field of Classification Search .................. None
See application file for complete search history.

(56) References Cited

U.S. PATENT DOCUMENTS

| | | | |
|---|---|---|---|
| 5,671,218 | A | 9/1997 | I et al. |
| 5,797,082 | A | 8/1998 | Lusignan |
| 7,433,366 | B1 | 10/2008 | Anubolu et al. |
| 2003/0143995 | A1 | 7/2003 | Friedman et al. |
| 2004/0185868 | A1* | 9/2004 | Jain et al. ............... 455/453 |
| 2006/0252429 | A1* | 11/2006 | Chen et al. ............... 455/450 |
| 2007/0086379 | A1 | 4/2007 | Takayanagi et al. |

FOREIGN PATENT DOCUMENTS

JP  2003264878  9/2003

* cited by examiner

*Primary Examiner* — Kent Chang
*Assistant Examiner* — German Viana Di Prisco
(74) *Attorney, Agent, or Firm* — Brundidge & Stanger, P.C.

(57) ABSTRACT

Admission control wireless resources including a base station which obtains a down wireless resource available rate based on a down QoS requested bandwidth $B_i$ requested by a terminal i during QoS communication and a data rate $R_i$ which the terminal can receive. A down wireless resource usage rate is obtained by dividing a down QoS requested bandwidth B requested by the terminal trying to perform QoS communication by the data rate R which the terminal can receive. An up wireless resource available rate is obtained based on ROT of an up channel and a threshold value $T_1$ indicating an allowable upper limit of the ROT. The QoS communication is performed on the terminal in which the up and down wireless resource available rates are respectively equal to or more than the up and down wireless resource usage rates.

3 Claims, 9 Drawing Sheets

510

CHANNEL 1

| TERMINAL i | DOWN QoS REQUESTED BANDWIDTH Bi | UP QoS REQUESTED BANDWIDTH | A i |
|---|---|---|---|
|  |  |  |  |

(a)

550

CHANNEL 1

| TERMINAL i | DATA RATE $R_i$ |
|---|---|
|  |  |

CHANNEL 1

| TERMINAL i | S/N $P_i$ |
|---|---|
|  |  |

(a)

570

| CHANNEL j | ROT |
|---|---|
|  |  |

| TERMINAL REGISTRATION NUMBER | DOWN QoS REQUESTED BANDWIDTH | UP QoS REQUESTED BANDWIDTH |
|---|---|---|
| 1 | F1 | R1 |
| 2 | — | — |
| 3 | F2 | R2 |
| 4 | — | — |

FIG. 5

···1 TIME SLOT 1 kbit, 3 kbit CAN BE STORED ACCORDING TO DIFFERENCE IN MODULATION TYPE (a)

1s

ENSURED BANDWIDTH = 6 kbps
WIRELESS RESOURCE USAGE RATE = 0.2

(b)

1s

ENSURED BANDWIDTH = 6 kbps
WIRELESS RESOURCE USAGE RATE = 0.6

WIRELESS COMMUNICATION SYSTEM AND BASE STATION

The present application is a divisional application of application Ser. No. 11/476,058, filed Jun. 28, 2006 now U.S. Pat. No. 7,634,278, the contents of which are incorporated herein with reference.

BACKGROUND OF THE INVENTION

The present invention relates to a wireless communication system and a base station, and particularly to a wireless communication system and a base station in which admission control is performed in a system of performing information communication by wireless.

As a Quality of Service (QoS) technique in wireless information communication, there is known a technique in which a wireless resource is preferentially allocated to a QoS call in order to ensure the requested bandwidth of the QoS call. The wireless resource indicates, for example, a time slot in Time Division Multiple Access (TDMA) communication, total received power allowable to enable demodulation at a receiving end in Code Division Multiple Access (CDMA) communication, or the like.

It has been disclosed that with respect to a terminal requesting QoS, it is confirmed at the time of new call connection or the time of handoff whether a usable channel element exists, and whether a remaining bandwidth is larger than a bandwidth requested by the terminal, and when the channel element exists and the remaining bandwidth is larger than the requested bandwidth, the call connection is performed (see, for example, patent document 1). In the case where the usable channel element does not exist, or in the case where, although the usable channel element exists, the remaining bandwidth is smaller than the requested bandwidth of the terminal, the call connection is not performed. By the processing as stated above, for example, according to the technique of patent document 1, the QoS can be ensured for the call-connected QoS requesting terminal.

Patent Document 1: JP-A-2003-264878

SUMMARY OF THE INVENTION

The amount of wireless resources consumed to ensure the requested bandwidth with the same magnitude is different between a time when the wireless environment is good and a time when the wireless environment is poor. In general, the worse the wireless environment is, the more the wireless resources are consumed.

FIGS. 9A and 9B show a relation between a bandwidth and a wireless resource while the TDMA is used as an example. In this example, it is assumed that 10 time slots exist in 1 second, and 1 kbit or 3 kbits can be selectively stored in 1 time slot by changing a modulation system. The maximum bandwidth of this channel is 30 kbps. In the case where the wireless environment is good, the modulation system is used in which 3 kbits are stored in each time slot, while in the case where the wireless environment is poor, the modulation system is used in which 1 kbit is stored in each time slot. Here, as an example, consideration is given to a case where a requested bandwidth of 6 kbps is ensured.

FIG. 9A shows an example of a case where the wireless environment is good. In the case where the wireless environment is good, 3 kbits can be stored in 1 time slot, and 2 time slots are occupied in order to ensure 6 kbits. Accordingly, the wireless resource usage rate becomes 0.2 (the number of used slots is 2, the number of all time slots is 10). FIG. 9B shows an example of a case where the wireless environment is poor. In the case where the wireless environment is poor, since only 1 kbit can be stored in 1 time slot, 6 time slots are occupied in order to ensure 6 kbps. Accordingly, the wireless resource usage rate becomes 0.6 (the number of used slots is 6, the number of all time slots is 10).

Consideration is given to a case where a bandwidth of 6 kbps is further required in this state. In both FIGS. 9A and 9B, a bandwidth of 24 kbit is available. However, according to the wireless environment of the terminal requesting the bandwidth, there is a case where the requested 6 kbps can not be ensured. For example, in the example of FIG. 9A, 6 kbps can be ensured in both the foregoing modulation systems, and in FIG. 9B, 6 kbps can be ensured in the modulation system of storing 3 kbits in 1 time slot. However, the example of FIG. 9B is the example in which the wireless environment is poor, and unless the wireless environment is changed, the modulation system in which 1 kbit is stored in 1 time slot is used, and 6 time slots are required in order to ensure the bandwidth of 6 kbps. Accordingly, although the bandwidth of 24 kbps exists, the wireless resource is insufficient, and the required 6 kbps can not be ensured.

In the technique disclosed in patent document 1, a judgment as to whether or not the QoS can be provided is made based on whether or not the available bandwidth is larger than the required bandwidth. However, even if call connection is allowed since the available bandwidth is larger than the requested bandwidth, as described above, a case can occur in which the wireless resource is not actually available, and the requested bandwidth can not be ensured. Accordingly, it is desired to make a call connection possible/impossible judgment using, as an index, the usage rate of the wireless resource, not the requested bandwidth.

Besides, according to the technique disclosed in patent document 1, with respect to a QoS-capable terminal in which QoS provision is made possible at the time of call connection, the QoS is ensured. However, the wireless environment is changed from hour to hour by phasing or shadowing, and a time can occur in which the requested bandwidth can not be ensured on the time axis. At that time, in order to satisfy the requested bandwidth, the QoS terminal is controlled to use more wireless resources, and this becomes a large load for the wireless resource. That is, the terminal hinders the QoS provision to another QoS-capable terminal. With respect to the terminal in such a state, it is desired to provide a measure not to hinder the QoS provision to the another terminal.

In view of the above, the invention has an object to provide admission control to perform the new call connection of a terminal and call connection to a handoff destination in view of wireless resources. Besides, the invention has an object to take measures to prevent a terminal having a high wireless resource usage rate from disturbing QoS to other terminals in a case where a wireless resource usage rate becomes high.

Besides, the invention has an object to provide admission control in which a judgment as to whether or not QoS provision can be provided is made by using an index of a wireless resource usage rate, and which prevents that a call-connected QoS requesting terminal can not start QoS communication because of insufficiency of wireless resources. Besides, the invention has an object to increase QoS calls which can receive QoS provision. The invention has an object to call-connect a new QoS requesting terminal.

An index of a wireless resource usage rate is provided. The index is managed for each terminal and each channel, and the judgment as to whether or not QoS can be provided is made by using the index.

(1) According to one of the solving means of the invention, the index of the wireless resource usage rate is provided, a wireless resource available rate of a channel and a wireless resource usage rate necessary to ensure a requested bandwidth of a terminal requesting connection are compared with each other at the time of QoS call connection, and the QoS call connection is performed when the available rate is larger.

(2-1) According to another solving means of the invention, the wireless resource usage rate of a channel is periodically calculated, and in a case where the wireless resource usage rate of the channel exceeds a first threshold value, wireless resource usage rates of respective QoS-capable terminals are calculated, and among the QoS-capable terminals, a terminal in which the wireless resource usage rate exceeds a second threshold value is changed to best effort.

(2-2) In a case where the wireless resource usage rate of the channel exceeds the first threshold value and another channel exists, the terminal is handed off to the another channel. At that time, a terminal is handed off in which both the wireless resource usage rate of the handoff source channel after the handoff and the wireless resource usage rate of the handoff destination channel become lower than the first threshold value.

More specifically, a wireless communication system includes a base station, and the base station uses a wireless resource usage rate as an index and judges whether or not QoS can be provided. Besides, at the time of new call connection of a terminal or call connection to a handoff destination, as to whether or not QoS can be provided, the base station makes a handoff possible/impossible judgment by comparing the remainder of the wireless resource of the channel with a wireless resource estimated to be occupied by the terminal at the time of QoS.

The base station monitors the wireless resource usage rate of the channel, and in the case where the wireless resource usage rate exceeds the first threshold value, the QoS terminal in which the wireless resource usage rate exceeds the second threshold value is changed to best effort. Here, the first threshold value is a threshold value which serves as an opportunity to cause the base station to start a processing of changing the QoS terminal in which the wireless resource usage rate exceeds the second threshold value to the best effort. Besides, the second threshold value is a threshold value which becomes a criterion of judgment as to whether or not the base station changes the QoS terminal to the best effort, and for example, the QoS terminal in which the wireless resource usage rate exceeds the second threshold value is changed to the best effort.

In the foregoing wireless communication system, in the case where the wireless resource usage rate still exceeds the first threshold value after the foregoing procedure is performed, when another channel exists and when a QoS terminal exists in which wireless resource usage rates of both the handoff source channel and the handoff destination channel become the first threshold value or less by handing off the QoS terminal to the another channel, the base station hands off the terminal to the another channel.

According to the first solving means of this invention, there is provided a base station in a wireless communication system comprising the base station to communicate with a terminal by wireless and by time division multiplexing, and a node to perform best effort communication and QoS communication with the terminal through the base station, wherein the base station comprises:

a requested bandwidth storage part in which a first requested bandwidth requested by one or plurality of first terminals during QoS communication and a second requested bandwidth requested by a second terminal trying to perform QoS communication are stored for each terminal;

a data rate reception management part that receives a data amount which the first and the second terminal can receive in each time slot from the terminals, which depends on changing the data amount stored in each time slot according to wireless environment, calculates a first and a second data rates which the first and the second terminals can receive by obtaining a time average value of the data amount for each terminal, and stores the data rates for each terminal; and a control part to control the base station, and wherein the control part obtains a wireless resource available rate, based on a first requested bandwidth $B_i$ which is stored in the requested bandwidth storage part and is requested by the first terminal i, and a first data rate $R_i$ which the first terminal i can receive and which is stored in the data rate reception management part, by a following expression:

$$1 - \sum_i \frac{B_i}{R_i}$$

the control part obtains a wireless resource usage rate of the second terminal necessary to ensure the second requested bandwidth B, by dividing the second requested bandwidth B which is stored in the requested bandwidth storage part and is requested by the second terminal by the second data rate R which the second terminal can receive and which is stored in the data rate reception management part, and the control part transmits, with respect to the second terminal in which the wireless resource available rate is equal to or more than the wireless resource usage rate, a connection establishment request for QoS, for performing QoS communication between the second terminal and the node, to the node.

According to the second solving means of this invention, there is provided a base station in a wireless communication system comprising the base station to communicate with a terminal by wireless and by code division multiplexing, and a node to perform best effort communication and QoS communication with the terminal through the base station, wherein the base station comprises:

a requested bandwidth storage part in which a requested bandwidth is stored for each terminal;

an S/N management part to store a value of S/N of a pilot channel for each terminal;

an ROT management part to store a value of ROT (Rise Over Thermal) for each channel;

where, ROT is defined by a following expression $(I_0+N_0)/N_0$ here, $I_0$ is total of received power from all terminals, $N_0$ is thermal noise power, a threshold value storage part to store a previously determined threshold value indicating an allowable upper limit of the ROT; and a control part to control the base station, and wherein the control part obtains a wireless resource available rate, based on a value T of ROT of a channel stored in the ROT management part and a threshold value $T_1$ stored in the threshold value storage part, by a following expression:

$1-T/T_1$, the control part obtains a wireless resource usage rate of the second terminal, which is necessary to ensure the requested bandwidth stored in the requested bandwidth storage part and is requested by the second terminal, by a following expression:

$$A \times P \times T/T_1,$$

where, A is a ratio of total transmission power to transmission power of a pilot channel when the second terminal transmits data in the requested bandwidth, and uniquely determined according to the requested bandwidth, P is an S/N value of the pilot channel of the second terminal stored in the S/N management part, T is ROT of a channel stored in the ROT management part, and $T_1$ is a previously determined threshold value indicating an allowable upper limit of ROT, which is stored in the threshold value storage part, and the control part transmits, with respect to the second terminal in which the wireless resource available rate is equal to on more than the wireless resource usage rate, a connection establishment request for QoS, for performing QoS communication between the second terminal and the node, to the node.

According to the third solving means of this invention, there is provided a base station in a wireless communication system comprising the base station to communicate with a terminal by wireless, by time division multiplexing in a downward direction to the terminal, and by code division multiplexing in an upward direction from the terminal, and a node to perform best effort communication and QoS communication with the terminal through the base station, wherein the base station comprises:

a requested bandwidth storage part in which a first down requested bandwidth requested by one or plurality of first terminals during QoS communication, a second down requested bandwidth requested by a second terminal trying to perform QoS communication, and an up requested bandwidth are stored for each terminal;

a data rate reception management part that receives a data amount which the first and the second terminals can receive in each time slot from the terminals, which depends on changing the data amount stored in each time slot according to wireless environment, calculates a first and a second data rates which the first and the second terminals can receive by obtaining a time average value of the data amount for each terminal, and stores the data rates for each terminal;

an S/N management part to store a value of S/N of a pilot channel for each terminal;

an ROT management part to store a value of ROT (Rise Over Thermal) for each up channel;

a threshold value storage part to store a previously determined threshold value indicating an allowable upper limit of the ROT; and a control part to control the base station, and wherein the control part obtains a down wireless resource available rate, based on a first down requested bandwidth $B_i$ which is stored in the requested bandwidth storage part and is requested by the first terminal i, and a first data rate $R_i$ which the first terminal i can receive and which is stored in the data rate reception management part, by a following expression:

$$1 - \sum_i \frac{B_i}{R_i}$$

the control part obtains a down wireless resource usage rate of the second terminal necessary to ensure the second requested bandwidth B, by dividing the second down requested bandwidth B which is stored in the requested bandwidth storage part and is requested by the second terminal by the second data rate R which the second terminal can receive and which is stored in the data rate reception management part, the control part obtains an up wireless resource available rate, based on a value T of ROT of an up channel stored in the ROT management part and a threshold value $T_1$ stored in the threshold value storage part, by a following expression:

$$1 - T/T_1,$$

the control part obtains an up wireless resource usage rate of the second terminal, which is necessary to ensure the up requested bandwidth stored in the requested bandwidth storage part and is requested by the second terminal, by a following expression:

$$A \times P \times T/T_1,$$

where, A is a ratio of total transmission power to transmission power of a pilot channel when the second terminal transmits data in the up requested bandwidth, and uniquely determined according to the up requested bandwidth, P is an S/N value of the pilot channel of the second terminal stored in the S/N management part, T is ROT of an up channel stored in the ROT management part, and $T_1$ is a previously determined threshold value indicating an allowable upper limit of ROT, which is stored in the threshold value storage part, and the control part transmits, with respect to the second terminal in which the down wireless resource available rate is equal to or more than the wireless resource usage rate, and in which the up wireless resource available rate is equal to or more than the up wireless resource usage rate, a connection establishment request for QoS, for performing QoS communication between the second terminal and the node, to the node.

According to the fourth solving means of this invention, there is provided a base station in a wireless communication system comprising the base station having a first and a second channels and communicating with a terminal by wireless and by time division multiplexing, and a node to perform best effort communication and QoS communication with the terminal, wherein the base station obtains a first wireless resource usage rate in the first channel, based on a first requested bandwidth $B_i$ requested by one or plurality of first terminals i during QoS communication through the first channel and a first data rate $R_i$ which the first terminal i can receive and which depends on changing a data amount stored in each time slot according to wireless environment, by a following expression:

$$\sum_i \frac{B_i}{R_i}$$

the base station obtains a second wireless resource usage rate of the second terminal, which is necessary to ensure a requested bandwidth B, by dividing the second requested bandwidth B requested by an arbitrary second terminal during QoS communication through the first channel by a second data rate R which the second terminal can receive, the base station obtains a predicted value of a wireless resource usage rate in the first channel after the second terminal hands off to the second channel by subtracting the second wireless resource usage rate of the second terminal from the first wireless resource usage rate in the first channel, the base station obtains a third wireless resource usage rate in the second channel, based on a third requested bandwidth $B_k$ requested by one or plurality of third terminals k during QoS communication through the second channel and a third data rate $R_k$ which the third terminal k can receive, which depends on changing a data amount stored in each time slot according to wireless environment, by a following expression:

$$\sum_k \frac{B_k}{R_k}$$

the base station obtains a fourth wireless resource usage rate of the second terminal after the second terminal hands off to the second channel, by dividing the second requested bandwidth B requested by the second terminal by an average $R_{AVE}$ of the data rate which each terminal communicating through the second channel can receive, the base station obtains a predicted value of a wireless resource usage rate in the second channel after the second terminal hands off to the second channel by adding the fourth wireless resource usage rate in the second terminal to the third wireless resource usage rate in the second channel, and the base station hands off the second terminal from the first channel to the second channel in a case where both the obtained predicted value of the wireless resource usage rate in the first channel and the predicted value of the wireless resource usage rate in the second channel respectively become equal to or less than previously determined threshold values.

According to the fifth solving means of this invention, there is provided a base station in a wireless communication system comprising the base station having a first and a second channels and communicating with a terminal by wireless and by code division multiplexing, and a node to perform best effort communication and QoS communication with the terminal, wherein the base station obtains a first wireless resource usage rate in the first channel, by dividing ROT (Rise Over Thermal) $T_a$ of the first channel by a previously determined first ROT threshold value $T_1$ indicating an allowable upper limit of the ROT, the base station obtains a second wireless resource usage rate of the second terminal, which is necessary to ensure a requested bandwidth requested by an arbitrary second terminal during QoS communication through the first channel, by a following expression:

$$A \times P \times T_a / T_1,$$

where, A is a ratio of total transmission power to transmission power of a pilot channel when the second terminal transmits data in the requested bandwidth, and uniquely determined according to the requested bandwidth, P is S/N of the pilot channel of the second terminal, $T_a$ is ROT of the first channel, and $T_1$ is a previously determined first ROT threshold value indicating an allowable upper limit of ROT, the base station obtains a predicted value of a wireless resource usage rate in the first channel after the second terminal hands off to the second channel by subtracting the second wireless resource usage rate in the second terminal from the first wireless resource usage rate in the first channel, the base station obtains a third wireless resource usage rate in the second channel, by dividing ROT $T_b$ of the second channel by a previously determined second threshold value $T_2$ indicating an allowable upper limit of the ROT, the base station obtains a fourth wireless resource usage rate of the second terminal after the second terminal hands off to the second channel by a following expression:

$$A \times P_{AVE} \times T_b / T_2,$$

where, A is a ratio of total transmission power to transmission power of the pilot channel when the second terminal transmits data in the requested bandwidth, and uniquely determined according to the requested bandwidth, $P_{AVE}$ is an average of S/N of the pilot channel of all terminals communicating through the second channel, $T_b$ is ROT of the second channel, and $T_2$ is a previously determined second ROT threshold value indicating an allowable upper limit of the ROT, the base station obtains a predicted value of a wireless resource usage rate in the second channel after the second terminal hands off to the second channel by adding the fourth wireless resource usage rate in the second terminal to the third wireless resource usage rate in the second channel, and the base station hands off the second terminal from the first channel to the second channel in a case where both the obtained predicted value of the wireless resource usage rate in the first channel and the predicted value of the wireless resource usage rate in the second channel respectively become equal to or less than previously determined threshold values.

According to the sixth solving means of this invention, there is provided a wireless communication system comprising:

a base station to communicate with a terminal by wireless and by time division multiplexing; and a node that has a QoS information table in which a requested bandwidth requested by the terminal is previously stored correspondingly to an identifier of the terminal and performs best effort communication and QoS communication with the terminal through the base station, wherein the base station comprises:

a requested bandwidth storage part in which a first requested bandwidth requested by one or plurality of first terminals during QoS communication and a second requested bandwidth requested by a second terminal trying to perform QoS communication are stored for each terminal;

a data rate reception management part that receives a data amount which the first and the second terminals can receive in each time slot from the terminals, which depends on changing the data amount stored in each time slot according to wireless environment, calculates a first and a second data rates which the first and the second terminals can receive by obtaining a time average value of the data amount for each terminal, and stores the data rates for each terminal; and a control part to control the base station, wherein the node receives a connection establishment request for best effort, which includes an identifier of the second terminal trying to perform QoS communication, from the base station, and previously establishes connection for best effort between the second terminal and the node, and the node refers to the QoS information table and transmits a second requested bandwidth corresponding to the identifier of the second terminal included in the establishment request to the base station, the control part stores the second requested bandwidth received from the node into the requested bandwidth storage part, the control part obtains a wireless resource available rate, based on a first requested bandwidth $B_i$ which is stored in the requested bandwidth storage part and is requested by the first terminal i and a first data rate $R_i$ which the first terminal i can receive and which is stored in the data rate reception management part, by a following expression:

$$1 - \sum_i \frac{B_i}{R_i}$$

the control part obtains a wireless resource usage rate of the second terminal, which is necessary to ensure the second requested bandwidth B, by dividing the second requested bandwidth B which is stored in the requested bandwidth storage part and is requested by the second terminal by the second data rate R which the second terminal can receive and which is stored in the data rate reception management part, and the control part transmits, with respect to the second terminal in which the wireless resource available rate is equal to or more than the wireless resource usage rate, a connection establishment request for QoS, for performing QoS communication between the second terminal and the node, to the node.

According to the seventh solving means of this invention, there is provided a wireless communication system comprising:

a base station to communicate with a terminal by wireless and by code division multiplexing; and a node that has a QoS information table in which a requested bandwidth requested by the terminal is previously stored correspondingly to an identifier of the terminal and performs best effort communication and QoS communication with the terminal through the base station, wherein the base station comprises:

a requested bandwidth storage part in which a requested bandwidth is stored for each terminal;

an S/N management part to store a value of S/N of a pilot channel for each terminal;

an ROT management part to store a value of ROT (Rise Over Thermal) for each channel;

a threshold value storage part to store a previously determined threshold value indicating an allowable upper limit of the ROT; and a control part to control the base station, wherein the node receives a connection establishment request for best effort, which includes an identifier of a second terminal trying to perform QoS communication, from the base station, and previously establishes connection for best effort between the second terminal and the node, and the node refers to the QoS information table and transmits a requested bandwidth corresponding to the identifier of the second terminal included in the establishment request to the base station, the control part stores the second requested bandwidth received from the node into the requested bandwidth storage part, the control part obtains a wireless resource available rate, based on a value T of ROT of a channel stored in the ROT management part and a threshold value $T_1$ stored in the threshold value storage part, by a following expression:

$$1 - T/T_1,$$

the control part obtains a wireless resource usage rate of the second terminal, which is necessary to ensure a requested bandwidth stored in the requested bandwidth storage part and is requested by the second terminal, by a following expression:

$$A \times P \times T/T_1,$$

where, A is a ratio of total transmission power to transmission power of a pilot channel when the second terminal transmits data in the requested bandwidth, and uniquely determined according to the requested bandwidth, P is an S/N value of the pilot channel of the second terminal stored in the S/N management part, T is ROT of a channel stored in the ROT management part, and $T_1$ is a previously determined threshold value indicating an allowable upper limit of ROT, which is stored in the threshold value storage part, and the control part transmits, with respect to the second terminal in which the wireless resource available rate is equal to or more than the wireless resource usage rate, a connection establishment request for QoS, for performing QoS communication between the second terminal and the node, to the node.

According to the invention, it is possible to provide the admission control to perform the new call connection of a terminal and call connection to a handoff destination in view of the wireless resources. Besides, according to the invention, in the case where the wireless resource usage rate becomes high, measures can be taken to prevent a terminal having a high wireless resource usage rate from disturbing the QoS of another terminal.

Besides, according to the invention, it is possible to provide the admission control in which the judgment as to whether or not the QoS can be provided is made by using the index of the wireless resource usage rate, and which prevents that a call-connected QoS requesting terminal can not start the QoS communication because of insufficiency of wireless resources. Besides, according to the invention, QoS calls which can receive the QoS provision can be increased. According to the invention, it becomes possible to call-connect a new QoS requesting terminal.

BRIEF DESCRIPTION OF THE DRAWINGS

FIGS. 3A and 3B show data formats (1) of respective blocks of the base station.

FIGS. 4A and 4B show data formats (2) of respective blocks of the base station.

FIG. 5 shows an example of a QoS information table owned by PDSN.

DESCRIPTION OF THE PREFERRED EMBODIMENTS OF THE INVENTION

1. First Embodiment (Hardware Structure)

A description will be made while as a wireless communication system, a 1×EV-DO (1× Evolution Data Only) system is used as an example.

Figure 1:
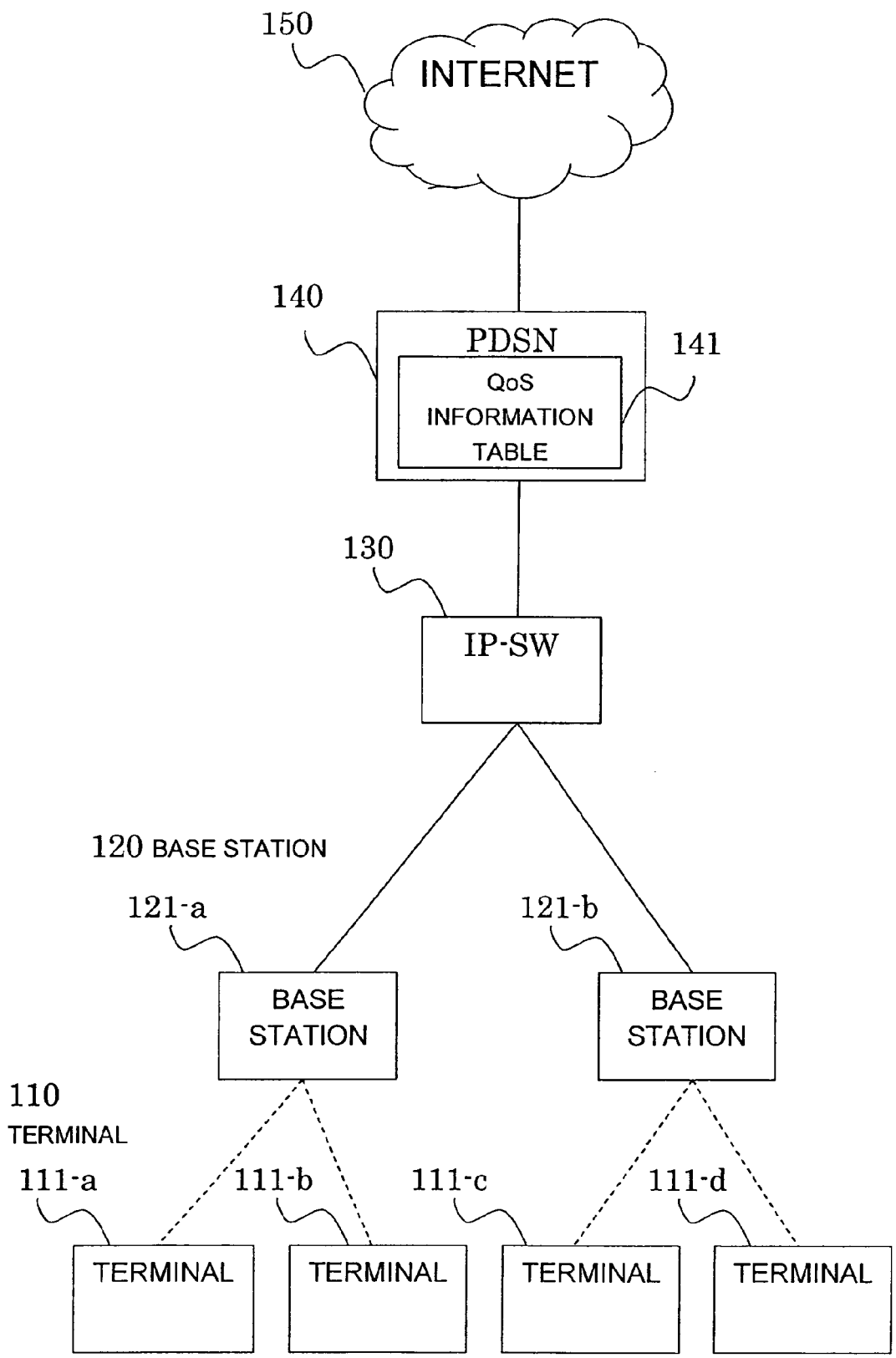
FIG. 1 is a system structural view of a wireless information communication system to which the invention is applied.

FIG. 1 is a view showing an example of a system structure of the 1×EV-DO system. The 1×EV-DO system includes, for example, terminals 110, base stations 120, an IP-SW (IP Switch) 130, and a PDSN (Packet Data Serving Node) 140. The PDSN 140 is connected to the Internet 150. Besides, the PDSN includes a QoS information table 141.

Wireless communication is provided between the base station 120 and the terminal 110, and is indicated by a broken line in the figure. On the other hand, a solid line in the figure indicates cable communication. In this example, transmission (down) from the base station 120 to the terminal 110 is TDMA communication, and transmission (up) from the terminal 110 to the base station 120 is CDMA communication. Plural channels exist in each of the down transmission and the up transmission.

Figure 2:
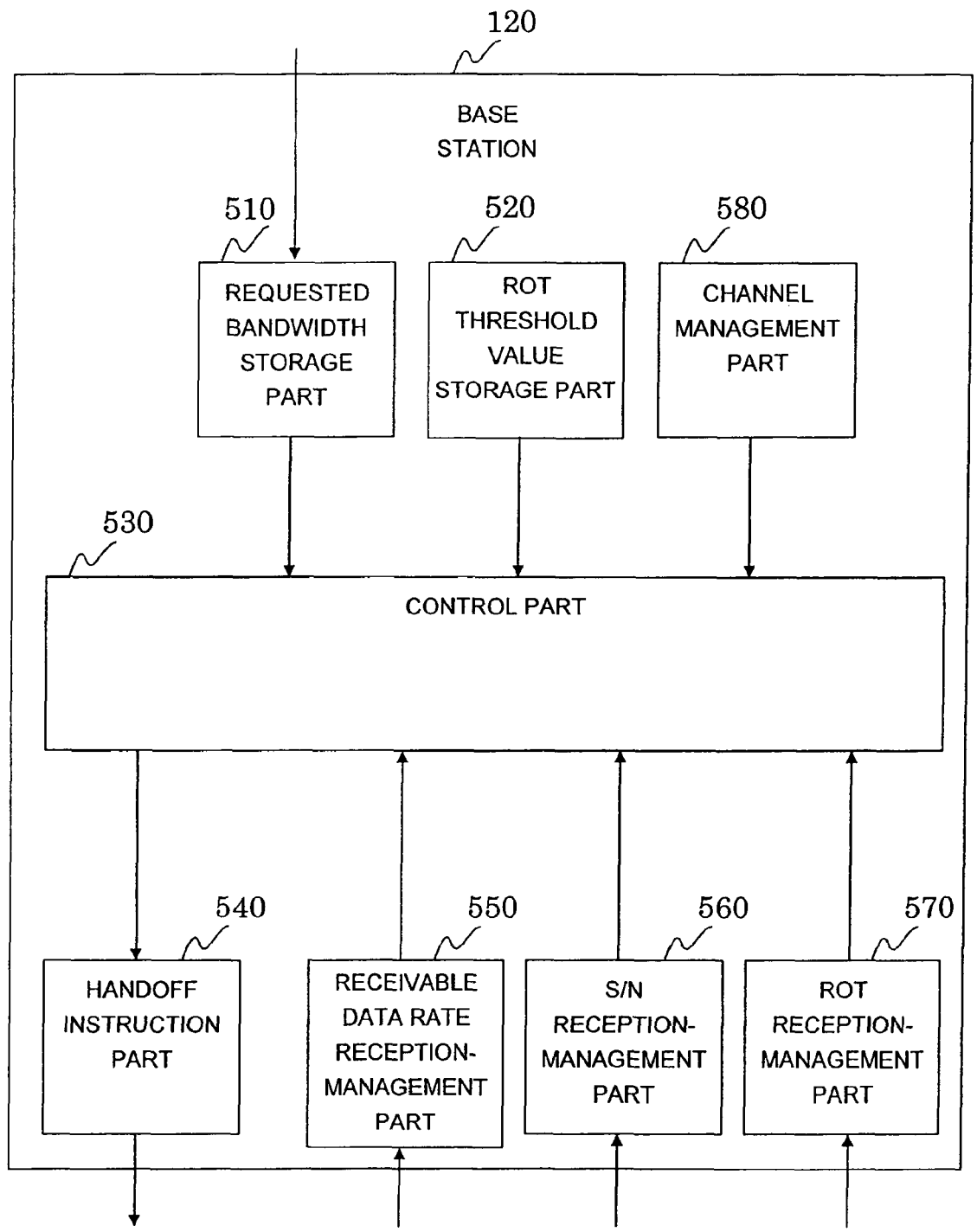
FIG. 2 is a functional block diagram of a base station in the wireless information communication system to which the invention is applied.

FIG. 2 is a functional block diagram of the base station 120 in this embodiment. Besides, FIGS. 3A and 3B and FIGS. 4A and 4B show data formats of respective blocks of the base station 120.

The base station 120 includes a requested bandwidth storage part 510, a ROT (Rise Over Thermal) threshold value storage part 520, a control part 530, a handoff instruction part 540, a receivable data rate reception-management part 550, an S/N reception-management part 560, a ROT reception-management part 570, and a channel management part 580.

In the requested bandwidth storage part 510, a down QoS requested bandwidth of a terminal i to which a call is connected, an up QoS requested bandwidth, and a value of a ratio $A_i$ of the total transmission power to transmission power of a pilot channel when the terminal i transmits data in the up QoS requested bandwidth are stored for each of the terminals 110. For example, the down and up QoS requested bandwidths of each terminal 110 to perform the QoS communication are acquired from the QoS information table 141 of the PDSN 140 and are stored in the requested bandwidth storage part 510. FIG. 3A shows an example of a table structure. For example, with respect to each channel managed by the base station 120, each data is stored (the figure shows an example of a channel 1).

A previously set ROT threshold value is stored in the ROT threshold value storage part 520. The ROT threshold value may be stored for each channel. The handoff instruction part 540 transmits, to the terminal 110, an instruction to perform handoff to a specified different channel. The receivable data rate reception-management part 550 receives, for each terminal 110, a data rate (data amount per 1 time slot) receivable in 1 time slot of the terminal 110 from the terminal 110. Besides, the receivable data rate reception-management part 550 calculates a time average value $R_i$ for each terminal i, obtains the data rate which the terminal 110 can receive, and manages and stores it. The time average value $R_i$ can be made, for example, a data rate (bps) per 1 second. For example, it is assumed that in a channel having 10 slots per 1 second (that is, 1 slot has 0.1 second), the data rate which the terminal 110 can receive in 1 time slot is 3 kbits. The time average value $R_i$ in this case is 3/0.1=30 kbps. FIG. 3B shows an example of a table structure. For example, with respect to each channel managed by the base station 120, each data is stored (the figure shows an example of the channel 1).

The S/N reception-management part 560 receives the S/N of a pilot channel for each terminal 110, and stores, for example, the S/N correspondingly to an identifier of the terminal 110. It is received from, for example, a suitable block (not shown) in the base station 120 to receive the pilot channel. FIG. 4A shows an example of a table structure. For example, with respect to each channel managed by the base station 120, each data is stored (the figure shows an example of the channel 1).

The ROT reception-management part 570 receives the ROT for each up channel, and stores the ROT correspondingly to, for example, an identifier of a channel. For example, it is received from a suitable block (not shown) in the base station 120 to obtain the ROT. FIG. 4B shows an example of a table structure. The channel management part 580 manages channels provided by the base station 120.

FIG. 5 shows the QoS information table 141 stored in the PDSN 140. The PDSN 140 includes the QoS information table 141 in which QoS information is previously stored correspondingly to a terminal registration number. For example, it is stored in a suitable memory or the like. The QoS information includes, for example, a down QoS requested bandwidth and an up QoS requested bandwidth. Incidentally, a suitable identifier to identify the terminal 110 can be used as the terminal registration number. Besides, with respect to the terminal 110 in which the QoS is not performed, no data may be stored, or previously determined specific data, such as zero or null, may be stored.

(Wireless Resource Usage Rate)

Here, the wireless resource usage rate in this embodiment will be defined.

Since the down transmission is the TDMA communication, the wireless resource usage rate is a time slot allocation rate. For example, as in FIG. 9A, when 2 time slots are used in a channel having 10 time slots per 1 second, the wireless resource usage rate is 0.2.

The terminal 110 transmits a data rate which can be received in each time slot to the base station 120, and in the base station 120, a value $R_i$ obtained by time-averaging that is managed in the receivable data rate reception-management part 550. The slot allocation rate of the ith terminal 110 in the channel becomes $$B_i/R_i \qquad (1)$$

by using the down QoS requested bandwidth $B_i$ of the ith terminal and the average $R_i$ of the data rate which the terminal 110 can receive.

Figure 9:
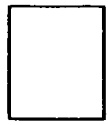
FIGS. 9A and 9B are views showing a relation between a bandwidth and a wireless resource while TDMA is used as an example.
Figure 9:
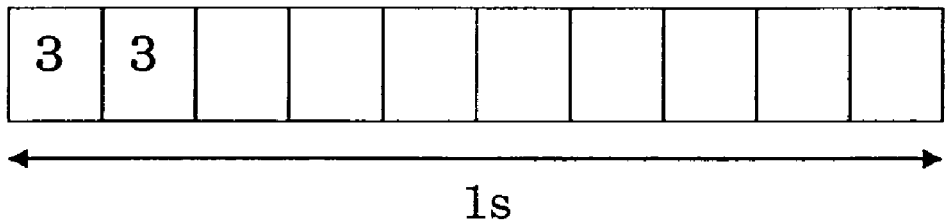
Figure 9:
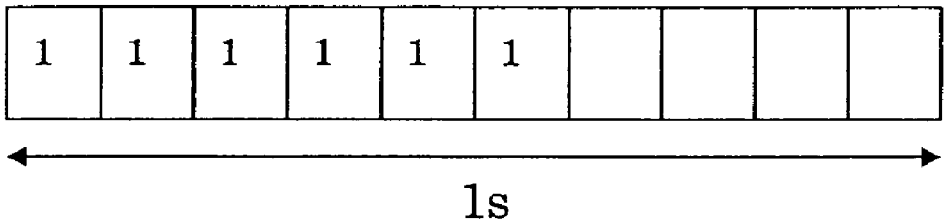

In the example of FIG. 9A, the terminal 110 has the QoS requested bandwidth $B_i$=6 kbps. Since 3 kbits can be stored in 1 time slot, and there are 10 time slots in 1 second, the average $R_i$ of the data rate which the terminal 110 can receive is 30 kbps. Accordingly, from the foregoing expression (1), the slot allocation rate (wireless resource usage rate) of the terminal 110 becomes 6/30=0.2. Besides, in the example of FIG. 9B, the terminal 110 has the QoS requested bandwidth $B_i$=6 kbps. Besides, since 1 kbit can be stored in 1 time slot, and there are 10 time slots in 1 second, the average $R_i$ of the data rate which the terminal 110 can receive is 10 kbps. Accordingly, from the foregoing expression (1), the slot allocation rate (wireless resource usage rate) of the terminal 110 is 6/10=0.6.

Besides, the slot allocation rate of all channels becomes as follows.

$$\sum_i \frac{B_i}{R_i} \quad (2)$$

On the other hand, since the up transmission is the CDMA communication, when ROT in the base station 120 becomes large, demodulation of a signal from each terminal 110 becomes difficult. Accordingly, the ROT is used as the index of the wireless resource usage rate of a channel. When the value of the ROT is made T and the allowable upper limit of the ROT is made a ROT threshold value $T_1$, the wireless resource usage rate of the channel becomes as follows.

$$T/T_1. \quad (3)$$

Incidentally, as the value T of the ROT, the value received and stored by the ROT reception-management part 570 can be used. Besides, as the ROT threshold value $T_1$, the value stored in the ROT threshold value storage part 520 can be used.

The wireless resource usage rate of the ith terminal 110 in the channel is the extent of contribution of the terminal 110 in the ROT of all the channels, and becomes as follows.

$$A_i \times P_i \times \frac{T}{T_1} \quad (4)$$

Here, Ai denotes the ratio of the total transmission power to the transmission power of the pilot channel when the terminal i transmits data in the up QoS requested bandwidth, and has a unique correspondence relation to the up QoS requested bandwidth. Pi denotes the S/N of the pilot channel of the terminal i which the base station 120 receives. Ai is uniquely obtained based on the QoS requested bandwidth and is stored in the requested bandwidth storage part 510. Pi is received and stored in the S/N reception-management part 560.

(Operation)

First, in this embodiment, a description will be given to a QoS provision possible/impossible determination processing at the time of new call connection of the terminal 110 or at the time of call connection to a handoff destination.

Figure 6:
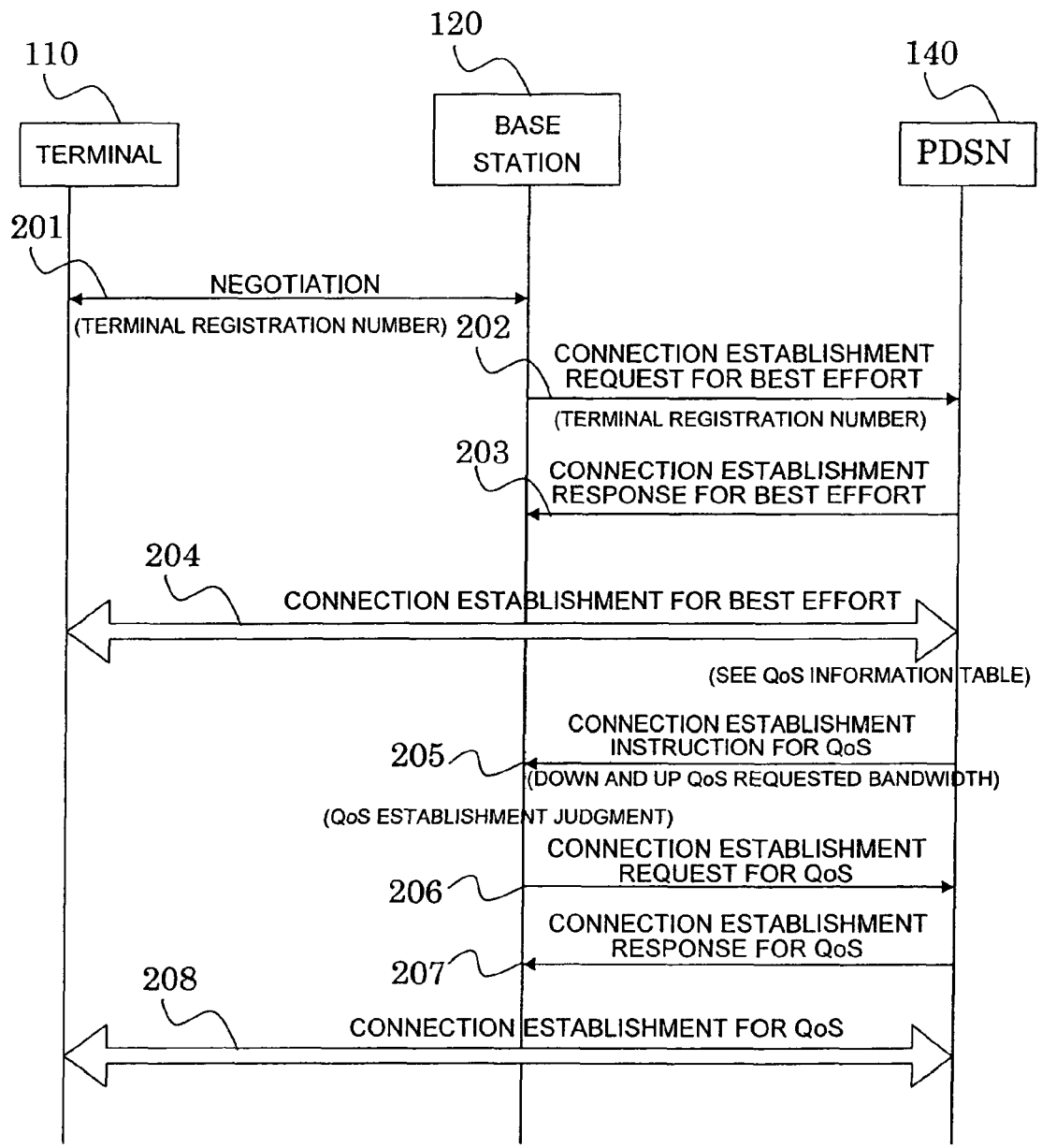
FIG. 6 is a sequence view of connection establishment at a time of new call connection of a terminal or at a time of call connection to a handoff destination in the wireless information communication system to which the invention is applied.

FIG. 6 is a sequence view of connection establishment at the time of new call connection or at the time of call connection to a handoff destination. First, a negotiation for communication start is performed between the terminal 110 and the base station 120 (processing 201). For example, the terminal 110 transmits a terminal registration number to the base station 120, and the base station 120 assigns an identification ID to the terminal 110. The terminal registration number is previously stored in the terminal 110.

When the negotiation is completed, the base station 120 transmits a connection establishment request for best effort to the PDSN 140 (processing 202). The connection establishment request for best effort includes the terminal registration number received from the terminal 110. When receiving the connection establishment request for best effort, the PDSN 140 transmits a connection establishment response for best effort to the base station 120 (processing 203). By this, the connection for best effort is established between the terminal 110 and the PDSN 140, and the terminal 110 can communicate with the Internet through the best effort (processing 204). In this embodiment, as an example, both a QoS terminal and a non-QoS terminal are first connected through the best effort.

After the connection for best effort is established, the PDSN 140 refers to the QoS information table 141 based on the terminal registration number received in the foregoing processing 202, and acquires a down QoS requested bandwidth and an up QoS requested bandwidth corresponding to the terminal registration number. For example, in the case where the connected terminal 110 is the QoS request terminal, the down and up QoS requested bandwidths are stored in the QoS information table 141, and the others are not stored therein. When acquiring the down and up QoS requested bandwidths, the PDSN 140 transmits a connection establishment instruction for QoS to the base station 120 (processing 205). The connection establishment instruction for QoS includes the down QoS requested bandwidth and the up QoS requested bandwidth of the connected terminal 110. Further, it may include a terminal registration number. On the other hand, the down and up QoS requested bandwidths are not stored and can not be acquired, the PDSN 140 terminates the processing. In this case, the communication in best effort is continued between the terminal 110 and the PDSN 140.

Figure 7:
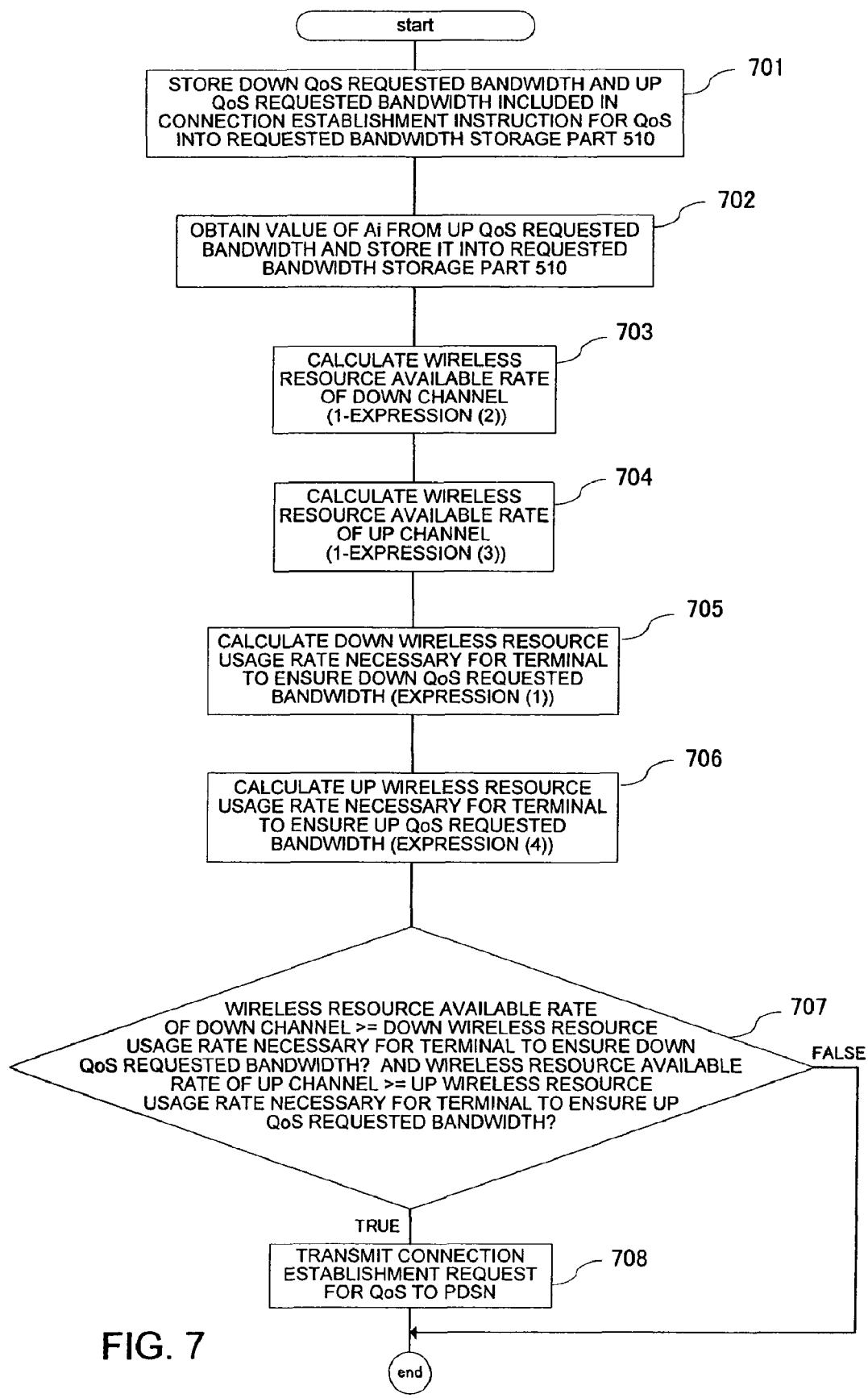
FIG. 7 is a flowchart relating to one of solving means of the invention.

FIG. 7 is a flowchart of the operation of the base station 120 having received the connection establishment instruction for QoS. The base station 120 having received the connection establishment instruction for QoS stores the value of the down QoS requested bandwidth and the value of the up QoS requested bandwidth included therein into the requested bandwidth storage part 510 (processing 701). They may be stored correspondingly to, for example, the terminal registration number received in processing 201 or the terminal registration number included in the connection establishment instruction for QoS. Besides, the base station 120 obtains the value of $A_i$ from the QoS requested bandwidth uniquely, and similarly stores it into the requested bandwidth storage part 510 (processing 702). Incidentally, the way of obtaining the value of $A_i$ may be a previously determined suitable method such as a conventional method.

The base station 120 calculates, with respect to each of the up and down transmissions, the wireless resource available rate of the channel through which the best effort call of the terminal 110 is provided (processing 703, processing 704). The wireless resource available rate of the channel is obtained from the wireless resource usage rate of 1 channel. The wireless resource usage rate of the channel in the down transmission is calculated by the foregoing expression (2) using the down QoS requested bandwidth $B_i$ of each terminal i stored in the requested bandwidth storage part 510 and the time average $R_i$ of the receivable data rate of each terminal i managed by the receivable data rate reception-management part 550. The wireless resource usage rate in the up transmission is calculated by expression (3) using the ROT threshold value $T_1$ stored in the ROT threshold value storage part 520 and the value T of ROT received in the ROT reception-management part 570. That is, the wireless resource available rate of the down channel is $$1 - \sum_i \frac{B_i}{R_i}$$

and the wireless resource available rate of the up channel is $$1 - T/T_1$$

where, i denotes all terminals (first terminals) which perform QoS communication with the base station 120.

Next, the base station 120 calculates the wireless resource usage rate necessary for the terminal (second terminal) negotiated in processing 201 to ensure the QoS requested bandwidth. The wireless resource usage rate of the terminal 110 in the down transmission is calculated by the foregoing expression (1) using the down QoS requested bandwidth $B_i$ of the terminal 110 stored in the requested bandwidth storage part 510 and the time average $R_i$ of the receivable data rate of the terminal 110 managed by the receivable data rate reception-management part 550 (processing 705).

Specifically, the base station 120 (for example, the control part 530, the same applies hereinafter) acquires the corresponding down QoS requested bandwidth B from the requested bandwidth storage part 510 based on the terminal registration number received in processing 201 or the terminal registration number included in the connection establishment instruction for QoS received in processing 205. Incidentally, the down QoS requested bandwidth received in processing 205 may be used. Besides, the base station 120 acquires the corresponding data rate R from the receivable data rate reception-management part 550 based on the received terminal registration number. The base station 120 calculates B/R in accordance with the acquired values, and obtains the down wireless resource usage rate of the terminal 110 necessary to ensure the down QoS requested bandwidth B.

Besides, the base station 120 calculates the up wireless resource usage rate of the terminal 110 by multiplying the wireless resource usage rate ($T/T_1$) of the channel by S/N ($P_i$) of the pilot channel for each terminal 110 of the S/N reception-management part 560 and $A_i$ for each terminal 110 stored in the requested bandwidth storage part 510 (processing 706). That is, the calculation is performed by the foregoing expression (4).

Specifically, the base station 120 (for example, the control part 530) acquires the corresponding S/N value from the S/N reception-management part 560 based on the terminal registration number received in processing 201 or the terminal registration number included in the connection establishment instruction for QoS and received in processing 205, and acquires $A_i$ corresponding to the foregoing terminal registration number from the requested bandwidth storage part 510. Besides, the base station 120 acquires the ROT threshold value $T_1$ stored in the ROT threshold value storage part 520 and the value of ROT, stored in the ROT reception-management part 570, of the channel through which the terminal 110 communicates. The base station 120 obtains the up wireless resource usage rate of the terminal 110 by expression (4).

The base station 120 judges whether the wireless resource available rate of the channel is larger than the necessary wireless resource usage rate in both the up and down transmissions (processing 707), and when larger in both the up and down transmissions, the connection establishment instruction for QoS is transmitted to the PDSN 140 (processing 708, FIG. 6: processing 206). On the other hand, in the up or down transmission, when the wireless resource available rate of the channel is smaller than the necessary wireless resource usage rate (processing 707), the base station 120 does not transmit the connection establishment instruction for QoS to the PDSN 140, and terminates the processing. At this time, the terminal 110 continues the communication while maintaining the best effort. The base station 120 may repeat the foregoing processings 703 to 708 with respect to another channel. In the case where the necessary wireless resource usage rate is equal to the wireless resource available rate of the channel, the connection establishment instruction for QoS may be transmitted, or the processing may be terminated.

Return to FIG. 6, the PDSN 140 having received the connection establishment instruction for QoS transmits the connection establishment response for QoS to the base station 120 (processing 207). By this, the connection for QoS is established between the terminal 110 and the PDSN 140 (processing 208).

Incidentally, identifiers which can identify the down transmission, the up transmission and both the transmissions are made to be included in the connection establishment instruction for QoS, and QoS communication may be performed only in one of the up and down transmissions in which the wireless resource available rate of the channel is larger than the necessary wireless resource usage rate. For example, an identifier indicating a direction (up or down) of a channel in which the wireless resource available rate of the channel is larger, and the connection establishment instruction for QoS are transmitted to the PDSN 140, and the connection for QoS may be established only in the single direction corresponding to the identifier.

MODIFIED EXAMPLE

When the base station 120 has the QoS information table 141, the connection establishment instruction for QoS can be transmitted to the PDSN 140 at the stage of processing 202. For example, after the negotiation of processing 201, the up and down QoS requested bandwidths are acquired from the QoS information table owned by the base station 120, and the QoS provision possible/impossible calculation (processing 702 to processing 708) is performed, and when the QoS can be provided, processing 202 to processing 205 are not performed, but the connection establishment instruction for QoS is transmitted to the PDSN 140 from the first (processing 206). On the other hand, when the QoS can not be provided, the connection establishment request for best effort can also be transmitted to the PDSN 140 as in processing 202.

In this case, since the communication has not been previously performed in best effort, there is no time to calculate the average data rate $R_i$.

As the wireless resource usage rate which is necessary for the terminal 110 to ensure the requested bandwidth and is used in the QoS provision possible/impossible calculation, in the down transmission, an average $R_{AVE}$ of the receivable data rate of all the terminals 110 of the channel expressed by the following expression may be used in the expression (1) instead of $R_i$.

$$B_i / R_{AVE} \tag{5}$$

On the other hand, in the up transmission, the following expression may be used in which an average $P_{AVE}$ of S/N of pilot signals received in the base station 120 in the channel and over all the terminals 110 is used instead of $P_i$ in the expression (4).

$$A_i \times P_{AVE} \times \frac{T}{T_1} \tag{6}$$

Besides, as described before, the connection for QoS in both the up and down transmissions may be established only in the case where the QoS can be provided in both the up and down transmissions, or connection for QoS may be established only in one side when the QoS can be provided only in the one side. Besides, in the case where the QoS can be provided in neither the up and down transmissions, call connection may be rejected, or a connection establishment request for best effort is transmitted to the PDSN 140 and the connection for best effort may be established.

2. Second Embodiment

Next, a second embodiment will be described.

For example, the first embodiment relates to the processing at the time of new connection and the time of connection by handoff, while the second embodiment relates to a processing on a connected terminal 110. For example, a following processing is periodically performed.

Since a hardware structure in the second embodiment and the definition of a wireless resource usage rate are similar to those of the first embodiment, their description will be omitted.

(Operation)

Figure 8:
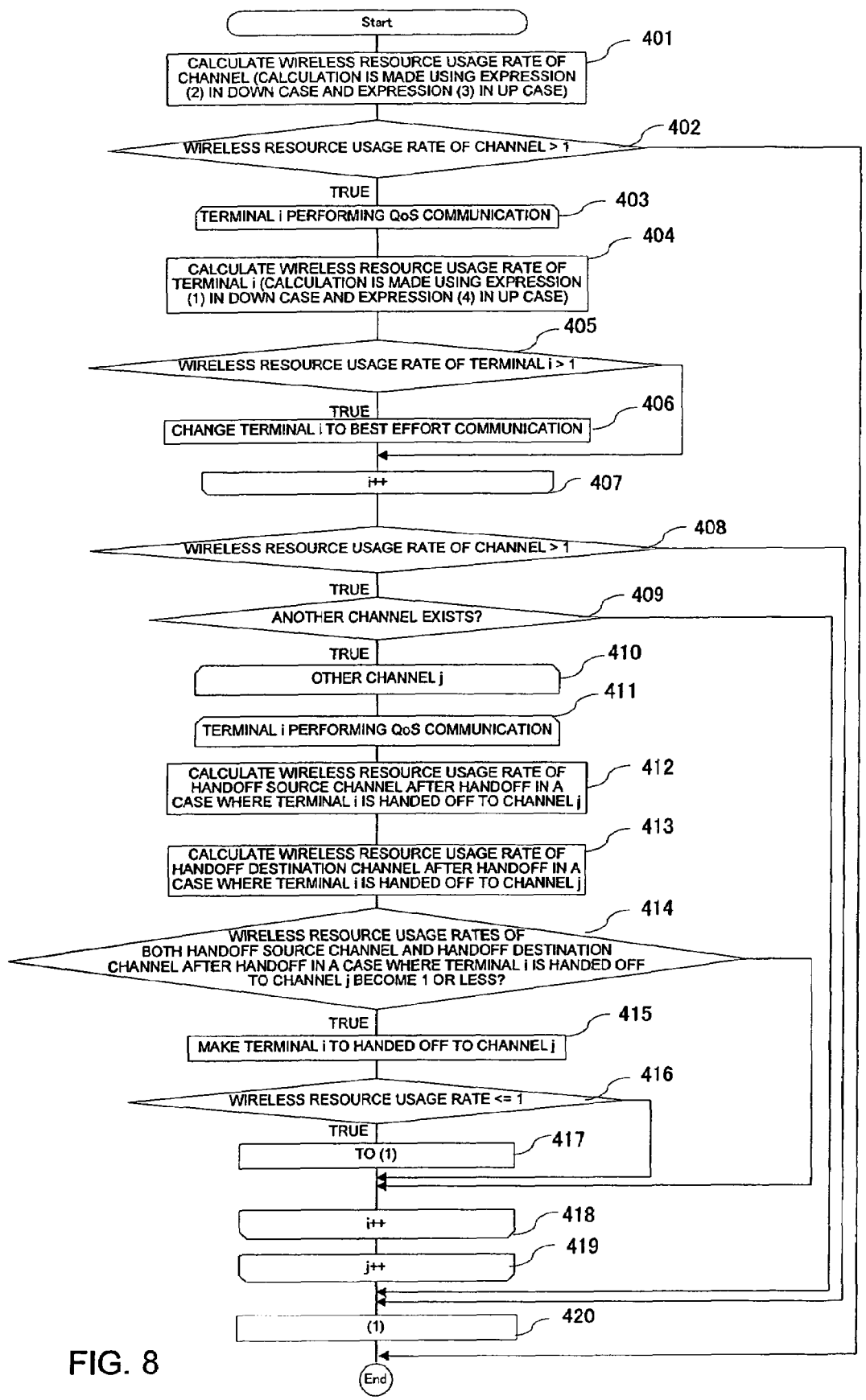
FIG. 8 is a flowchart relating to another solving means of the invention.

FIG. 8 is a flowchart in the second embodiment. A base station 120 periodically performs respective processings of the flowchart of FIG. 8. First, the flow of the processing will be described in brief.

In both up and down transmissions, the wireless resource usage rate of a channel is calculated using the foregoing expressions (2) and (3) (processing 401). In the case where there is a channel in which the wireless resource usage rate exceeds a first threshold value (for example, 1) (processing 402), the base station 120 obtains the wireless resource usage rate of the terminal 110 performing the QoS communication in the channel by, for example, the expression (1) for the down transmission and by the expression (4) for the up transmission (processings 403 and 404), and it is checked whether there is a terminal in which the wireless resource usage rate exceeds a second threshold value (for example, 1) (processing 405).

When there is a terminal 110 in which the wireless resource usage rate exceeds 1 (processing 405), since the terminal 110 is in such a state that the requested bandwidth can not be ensured even if all wireless resources are allocated, the base station 120 changes the terminal 110 in such a state to the best effort communication (processing 406). For example, by the change of the wireless environment, there can occur a case where the requested bandwidth can not be ensured according to the time. The base station 120 repeats the foregoing processings 404 to 406 on all terminals 110 in which the QoS communication is performed (processing 407).

In the case where the wireless resource usage rate of the channel exceeds 1 nevertheless (processing 408), the base station 120 confirms whether another channel exists (processing 409). Here, the another channel is, for example, a channel of another frequency, and information, such as ROT of the channel, a QoS requested bandwidth of the terminal 110 communicating through the channel, S/N, and a data rate, is managed in the respective blocks of the base station 120.

When the another channel exists, the base station 120 calculates whether or not, in the case where the terminal 110 is handed off to the another channel in the descending order of magnitude of the wireless resource usage rate of the terminal 110, the wireless resource usage rates of both the handoff source channel (first channel) after the handoff and the handoff destination channel (second channel) become smaller than 1 (processings 412 to 414). At that time, in processing 412, the wireless resource usage rate of the handoff source after the handoff is calculated by, for example, $$\text{wireless resource usage rate of channel of handoff source before handoff−wireless resource usage rate of terminal before handoff.} \quad (7)$$

As the wireless resource usage rate of the channel of the handoff source before the handoff, for example, the value obtained in processing 401 can be used. As the wireless resource usage rate of the terminal 110 before the handoff, for example, the value obtained in processing 404 can be used.

Besides, in processing 413, the wireless resource usage rate of the handoff destination after the handoff is calculated by, for example, $$\text{wireless resource usage rate of channel of handoff destination before handoff+wireless resource usage rate of terminal after handoff.} \quad (8)$$

As the wireless resource usage rate of the channel of the handoff destination before the handoff, for example, with respect to the channel of the handoff destination, values obtained by the foregoing expression (2) and expression (3) can be used. As the wireless resource usage rate of the terminal 110 after the handoff, the expression (5) can be used for the down transmission, and the expression (6) can be used for the up transmission. The detailed processing of processings 412 and 413 will be described later.

As a result of the calculation, in the case where the terminal 110 exists in which the wireless resource usage rates of the channels of both the handoff source and the handoff destination become smaller than 1 by the handoff (processing 414), the base station 120 transmits the handoff instruction including identification information to identify the channel of the handoff destination from the handoff instruction part 540 to the terminal 110, and hands off the terminal 110 to the channel of the handoff destination (processing 415).

The terminal 110 is changed and the processing is repeatedly performed until the wireless resource usage rate of the channel becomes 1 or less or it is found that there is no terminal 110 which can be handed off (processing 411 to processing 418). In the case where a terminal which can be handed off disappears while the wireless resource usage rate of the channel does not become 1 or less, and in the case where another channel exists, the channel is changed and the processing is repeated (processing 410 to processing 419). Incidentally, in the case where the respective conditions are not satisfied in processings 402, 408 and 409, the processing is terminated. Besides, in processing 417, the processing exits from the repeated processing (processing 410 to processing 419) and is terminated.

In this embodiment, although the first threshold value of the wireless resource usage rate of the channel, which serves as an opportunity to change the communication of the terminal 110 to the best effort, is made 1, another value may be set as the threshold value. Besides, in this embodiment, although the second threshold value of the wireless resource usage rate of the terminal 110, which serves as an opportunity to hand off the terminal 110, is made 1, another value may be set as the threshold value.

The processing (processing 412 to processing 415 of FIG. 8) to hand off the terminal 110 to another channel will be described below in detail. Incidentally, although the following description will be made while differentiating between up and down processings for convenience, both the up and down processings may be performed in parallel, or may be performed in series. Besides, only the down processing or only the up processing may be performed. Besides, in the following description, it is assumed that one or plural terminals (first terminals) perform communication through a first channel of the base station 120, and other one or plural terminals (third terminals) perform communication through a second channel.

First, the down processing will be described. At processing 412, first, based on a first down QoS requested bandwidth Bi requested by one or plural first terminals i during QoS communication through the first channel, and a first data rate Ri which the first terminal i can receive and which depends on changing the data amount stored in each time slot according to wireless environment, the base station 120 obtains a first down wireless resource usage rate in the first channel by the following expression.

$$\sum_i \frac{B_i}{R_i}$$

Here, as the down QoS requested bandwidth and the data rate, values stored in the requested bandwidth storage part 510 and the receivable data rate reception/management part 550 can be used. The same applies to a subsequent processing.

Besides, the base station 120 obtains a second down wireless resource usage rate of the second terminal, which is necessary to ensure the down QoS requested bandwidth B, by dividing the second down QoS requested bandwidth B requested by an arbitrary second terminal (for example, one of the first terminals) during QoS communication through the first channel by the second data rate R which the second terminal can receive.

The base station 120 obtains a predicted value of a down wireless resource usage rate in the first channel after the second terminal is handed off to the second channel by subtracting the second down wireless resource usage rate of the second terminal from the obtained first down wireless resource usage rate in the first channel. That is, the predicted value of the $$\text{predicted value} = \sum_i \frac{B_i}{R_i} - \frac{B}{R} \qquad (7')$$

down wireless resource usage rate of the handoff source (first channel) after the handoff is expressed by the following expression.

In processing 413, first, based on a third down QoS requested bandwidth $B_k$ requested by one or plural third terminals k during QoS communication in the second channel, and a third data rate $R_k$ which the third terminal k can receive and which depends on data amount stored in each time slot and changed according to wireless environment, the base station 120 obtains a third down wireless resource usage rate in the second channel by the following expression.

$$\sum_k \frac{B_k}{R_k}$$

Besides, the base station 120 obtains a fourth down wireless resource usage rate of the second terminal after the second terminal hands off to the second channel by dividing the second down QoS requested bandwidth B requested by the second terminal by the average $R_{AVE}$ of the third data rate Rp ($B/R_{AVE}$) which each terminal 110 communicating through the second channel can receive.

The base station 120 obtains a predicted value of a down wireless resource usage rate in the second channel after the second terminal hands off to the second channel by adding the fourth down wireless resource usage rate of the second terminal to the third down wireless resource usage rate in the $$\text{predicted value} = \sum_k \frac{B_k}{R_k} + \frac{B}{R_{AVE}} \qquad (8')$$

second channel. That is, the predicted value of the down wireless resource usage rate of the handoff destination (second channel) after the handoff is expressed by the following expression.

In the case where both the obtained predicted value of the down wireless resource usage rate in the first channel and the predicted value of the down wireless resource usage rate in the second channel respectively become the previously determined threshold values (for example, 1) or less (processing 414), the base station 120 hands off the second terminal from the first channel to the second channel (processing 415).

Next, the up processing will be described.

In processing 412, first, the base station 120 obtains a first up wireless resource usage rate in the first channel by dividing ROT (Rise Over Thermal) $T_a$ of the first channel by a previously determined first threshold value $T_1$ indicating an allowable upper limit of the ROT ($T_a/T_1$). Here, as the ROT ($T_a$) and the first threshold value $T_1$, values stored in the ROT reception/management part 570 and the ROT threshold value storage part 520 can be used.

The base station 120 obtains a second up wireless resource usage rate of the second terminal necessary to ensure an up QoS requested bandwidth requested by an arbitrary second terminal i during QoS communication through the first channel by the following expression:

$$A \times P \times T_a / T_1$$

where, A: a ratio of the total transmission power to transmission power of a pilot channel when the second terminal transmits data in the up QoS requested bandwidth, which is a value uniquely determined according to the up QoS requested bandwidth, P: S/N of the pilot channel of the second terminal, $T_a$: ROT of the first channel, and $T_1$: previously determined first threshold value indicating the allowable upper limit of ROT.

The base station 120 obtains a predicted value of the up wireless resource usage rate in the first channel after the second terminal hands off to the second channel by subtracting the second up wireless resource usage rate of the second terminal from the first up wireless resource usage rate in the first channel. That is, the predicted value of the up wireless resource usage rate of the handoff source (first channel) after the handoff is expressed by the following expression:

$$\text{predicted value} = T_a/T_1 - A \times P \times T_a/T_1 \qquad (7'')$$

Next, the base station 120 obtains a third up wireless resource usage rate in the second channel by dividing ROT ($T_b$) of the second channel by a previously determined second threshold value $T_2$ indicating an allowable upper limit of the ROT ($T_b/T_2$).

The base station 120 obtains a fourth up wireless resource usage rate of the second terminal after the second terminal hands off to the second channel by the following expression:

$$A \times P_{AVE} \times T_b / T_2$$

where, A: a ratio of the total transmission power to transmission power of the pilot channel when the second terminal transmits data in the up QoS requested bandwidth, which is a value uniquely determined according to the up QoS requested bandwidth, $P_{AVE}$: an average of S/N of the pilot channel of all the terminals 110 communicating through the second channel, $T_b$: ROT of the second channel, and $T_2$: a previously determined second threshold value indicating an allowable upper limit of ROT.

The base station 120 obtains a predicted value of the up wireless resource usage rate in the second channel after the second terminal hands off to the second channel by adding the fourth up wireless resource usage rate of the second terminal to the third up wireless resource usage rate in the second channel. That is, the predicted value of the up wireless resource usage rate of the handoff destination (second channel) after the handoff is expressed by the following expression:

$$\text{predicted value} = T_b/T_2 + A \times P_{AVE} \times T_b/T_2 \quad (8'')$$

In the case where both the obtained predicted value of the up wireless resource usage rate in the first channel and the predicted value of the up wireless resource usage rate in the second channel respectively become the previously determined threshold values (for example, 1) or less, the base station 120 hands off the second terminal from the first channel to the second channel.

Incidentally, the first embodiment and the second embodiment are combined, and for example, after the communication is started in the first embodiment, the second embodiment may be performed.

Incidentally, in this embodiment, although the description has been given to the case where the down transmission is the TDMA, the invention can be applied also to the case where the up transmission is the TDMA. Besides, although the description has been given to the case where the up transmission is the CDMA, the invention can be applied also to the case where the down transmission is the CDMA.

The invention can be used for the industry relating to the communication system to provide QoS, and the communication service.

What is claimed is:

1. A base station in a wireless communication system comprising:
    a base station having a first and a second channel and communicating with a terminal by wireless and by code division multiplexing, and a node to perform best effort communication and QoS communication with the terminal,
    wherein the base station obtains a first wireless resource usage rate in the first channel, by dividing Rise Over Thermal (ROT) $T_a$ of the first channel by a previously determined first ROT threshold value $T_1$ indicating an allowable upper limit of the ROT,
    wherein the base station obtains a second wireless resource usage rate of a second terminal, which is necessary to ensure a requested bandwidth requested by an arbitrary second terminal during QoS communication through the first channel, by a following expression:

$$A \times P \times T_a/T_1,$$

where, A is a ratio of total transmission power to transmission power of a pilot channel when the second terminal transmits data in the requested bandwidth, and uniquely determined according to the requested bandwidth, P is S/N of the pilot channel of the second terminal, $T_a$ is ROT of the first channel, and $T_1$ is a previously determined first ROT threshold value indicating an allowable upper limit of ROT,
    wherein the base station obtains a predicted value of a wireless resource usage rate in the first channel after the second terminal hands off to the second channel by subtracting the second wireless resource usage rate in the second terminal from the first wireless resource usage rate in the first channel,
    wherein the base station obtains a third wireless resource usage rate in the second channel, by dividing ROT $T_b$ of the second channel by a previously determined second threshold value $T_2$ indicating an allowable upper limit of the ROT,
    wherein the base station obtains a fourth wireless resource usage rate of the second terminal after the second terminal hands off to the second channel by a following expression:

$$A \times P_{AVE} \times T_b/T_2,$$

where, A is a ratio of total transmission power to transmission power of the pilot channel when the second terminal transmits data in the requested bandwidth, and uniquely determined according to the requested bandwidth, $P_{AVE}$ is an average of S/N of the pilot channel of all terminals communicating through the second channel, $T_b$ is ROT of the second channel, and $T_2$ is a previously determined second ROT threshold value indicating an allowable upper limit of the ROT,
    wherein the base station obtains a predicted value of a wireless resource usage rate in the second channel after the second terminal hands off to the second channel by adding the fourth wireless resource usage rate in the second terminal to the third wireless resource usage rate in the second channel, and
    wherein the base station hands off the second terminal from the first channel to the second channel in a case where both the obtained predicted value of the wireless resource usage rate in the first channel and the predicted value of the wireless resource usage rate in the second channel respectively become equal to or less than previously determined threshold values.

2. The base station according to claim 1, wherein in a case where the obtained second wireless resource usage rate of the second terminal is larger than the previously determined second threshold value, the base station changes the second terminal from the QoS communication to the best effort communication.

3. The base station according to claim 1, further comprising:
    a requested bandwidth storage part in which a requested bandwidth is previously stored for each terminal;
    an S/N management part to store a value of S/N of a pilot channel for each terminal;
    an ROT management part to store a value of ROT (Rise Over Thermal) for each channel;
    a threshold value storage part to store a previously determined threshold value indicating an allowable upper limit of the ROT, and
    a control part to control the base station.

* * * * *